US012580241B2

(12) United States Patent
Jeong et al.

(10) Patent No.: US 12,580,241 B2
(45) Date of Patent: Mar. 17, 2026

(54) ELECTRODE ASSEMBLY AND SECONDARY BATTERY COMPRISING THE SAME

(71) Applicant: LG ENERGY SOLUTION, LTD., Seoul (KR)

(72) Inventors: Min Gi Jeong, Daejeon (KR); Duk Hyun Ryu, Daejeon (KR); Jin Soo Kim, Daejeon (KR); Soo Jung Kim, Daejeon (KR); Han Saem Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 586 days.

(21) Appl. No.: 17/926,692

(22) PCT Filed: Jun. 3, 2021

(86) PCT No.: PCT/KR2021/006925
§ 371 (c)(1),
(2) Date: Nov. 21, 2022

(87) PCT Pub. No.: WO2021/251682
PCT Pub. Date: Dec. 16, 2021

(65) Prior Publication Data
US 2023/0198042 A1      Jun. 22, 2023

(30) Foreign Application Priority Data
Jun. 8, 2020      (KR) ........................ 10-2020-0069294

(51) Int. Cl.
*H01M 10/617* (2014.01)
*H01M 4/13* (2010.01)
(Continued)

(52) U.S. Cl.
CPC ........... *H01M 10/617* (2015.04); *H01M 4/13* (2013.01); *H01M 4/62* (2013.01);
(Continued)

(58) Field of Classification Search
CPC ........... H01M 10/617; H01M 10/0431; H01M 10/052; H01M 10/0525; H01M 10/0587;
(Continued)

(56) References Cited

U.S. PATENT DOCUMENTS

2006/0063066 A1      3/2006   Choi et al.
2007/0292751 A1      12/2007   Cherng et al.
(Continued)

FOREIGN PATENT DOCUMENTS

CN      1993846 A      7/2007
CN      2927335 Y      7/2007
(Continued)

OTHER PUBLICATIONS

Machine Translation of JP 2018125073 A (cited on IDS) (Year: 2018).*
(Continued)

*Primary Examiner* — Eugenia Wang
(74) *Attorney, Agent, or Firm* — Birch, Stewart, Kolasch & Birch, LLP

(57) ABSTRACT

An electrode assembly and a secondary battery including the same are provided. The electrode assembly includes an electrode stack, in which electrodes and a separator are alternately stacked to be wound, and a temperature difference compensating member disposed at a winding center of the electrode stack such that a temperature difference between a winding outer shell and a winding center of the electrode stack is reduced. The temperature difference compensating member includes a phase change material.

17 Claims, 7 Drawing Sheets

(51) Int. Cl.

| | |
|---|---|
| *H01M 4/62* | (2006.01) |
| *H01M 10/04* | (2006.01) |
| *H01M 10/052* | (2010.01) |
| *H01M 10/0525* | (2010.01) |
| *H01M 10/0587* | (2010.01) |
| *H01M 10/42* | (2006.01) |
| *H01M 10/643* | (2014.01) |
| *H01M 10/654* | (2014.01) |
| *H01M 10/659* | (2014.01) |

(52) U.S. Cl.
CPC ..... *H01M 10/0431* (2013.01); *H01M 10/052* (2013.01); *H01M 10/0525* (2013.01); *H01M 10/0587* (2013.01); *H01M 10/4235* (2013.01); *H01M 10/643* (2015.04); *H01M 10/654* (2015.04); *H01M 10/659* (2015.04)

(58) Field of Classification Search
CPC ........... H01M 10/4235; H01M 10/643; H01M 10/654; H01M 10/659; H01M 4/13; H01M 4/62
See application file for complete search history.

(56) References Cited

U.S. PATENT DOCUMENTS

| | | | |
|---|---|---|---|
| 2011/0081564 A1 | 4/2011 | Choi et al. | |
| 2016/0226042 A1 | 8/2016 | Hartmann et al. | |
| 2016/0226114 A1 | 8/2016 | Hartmann et al. | |
| 2018/0215981 A1 | 8/2018 | Biller et al. | |
| 2019/0252743 A1* | 8/2019 | Liu ..................... | H01M 10/637 |
| 2019/0393573 A1 | 12/2019 | Hartmann et al. | |

FOREIGN PATENT DOCUMENTS

| | | | |
|---|---|---|---|
| CN | 105514521 A | | 4/2016 |
| CN | 108183255 A | | 6/2018 |
| CN | 109830774 A | | 5/2019 |
| JP | 9-223514 A | | 8/1997 |
| JP | 11-40200 A | | 2/1999 |
| JP | 2005-209469 A | | 8/2005 |
| JP | 2011-103181 A | | 5/2011 |
| JP | 2013-41741 A | | 2/2013 |
| JP | 2014-241267 A | | 12/2014 |
| JP | 2016-12499 A | | 1/2016 |
| JP | 2017-177533 A | | 10/2017 |
| JP | 2018-514052 A | | 5/2018 |
| JP | 2018-125073 A | | 8/2018 |
| JP | 6400027 B2 | | 10/2018 |
| KR | 10-0388907 B1 | | 6/2003 |
| KR | 10-2006-0048991 A | | 5/2006 |
| KR | 10-0687217 B1 | | 2/2007 |
| KR | 10-2008-0066312 A | | 7/2008 |
| KR | 10-2013-0133444 A | | 12/2013 |
| KR | 10-2014-0129449 A | | 11/2014 |
| KR | 10-1502966 B1 | | 3/2015 |
| KR | 10-2016-0010121 A | | 1/2016 |
| WO | WO 2014/130676 A1 | | 8/2014 |

OTHER PUBLICATIONS

Extended European Search Report for European Application No. 21822360.0, dated Nov. 14, 2024.

International Search Report for PCT/KR2021/006925 mailed on Sep. 6, 2021.

* cited by examiner $$S \begin{cases} 130 \begin{cases} 110 \\ 120 \end{cases} \\ 160 \begin{cases} 140 \\ 150 \end{cases} \end{cases} \qquad 170 \begin{cases} 171 \\ 172 \end{cases}$$

ELECTRODE ASSEMBLY AND SECONDARY BATTERY COMPRISING THE SAME

CROSS-REFERENCE TO RELATED APPLICATION

The present application claims the benefit of the priority of Korean Patent Application No. 10-2020-0069294, filed on Jun. 8, 2020, which is hereby incorporated by reference in its entirety.

TECHNICAL FIELD

The present invention relates to an electrode assembly and a secondary battery comprising the same.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

Among them, the jelly-roll type electrode assembly is widely used because the jelly-roll type electrode assembly has an advantage is easily manufactured and has high energy density per weight.

In the case of the cylindrical cell comprising the jelly roll type electrode assembly, the positive electrode, the negative electrode, and the separator are wound to overlap each other to form a jelly roll and then inserted into the can to manufacture the cell. There is a temperature difference between a center of the cell and an outer shell of the cell. This occurs when the heat generated while repetitively perform charging and discharging is collected in the center of the cell. There is a problem in that the temperature difference inside the cell causes a difference in reaction rate between the center and the outer shell of the cell to deteriorate performance of the cell.

[Prior Art Document] (Patent Document) Korean Patent Publication No. 10-2016-0010121

DISCLOSURE OF THE INVENTION

Technical Problem

One aspect of the present invention is to provide an electrode assembly in which a temperature difference between a winding outer shell and a winding center of an electrode stack is reduced, and a secondary battery comprising the same.

Technical Solution

An electrode assembly according to an embodiment of the present invention comprises an electrode stack, in which electrodes and a separator are alternately stacked to be wound and a temperature difference compensating member disposed at a winding center of the electrode stack such that a temperature difference between a winding outer shell and a winding center of the electrode stack is reduced, wherein the temperature difference compensating member comprises a phase change material.

A secondary battery according to an embodiment of the present invention may comprise the electrode assembly according to an embodiment of the present invention.

Advantageous Effects

According to the present invention, when the temperature of the winding center of the electrode stack rises above a certain temperature during the charging and discharging of the battery, the temperature difference compensating member comprising the phase change material may be disposed at the winding center of the electrode stack and be changed in phase to absorb the heat of the winding center and thus to compensate so that the temperature difference between the winding outer shell and the winding center is reduced, thereby prevent the battery performance from being deteriorated.

MODE FOR CARRYING OUT THE INVENTION

Figure 1:
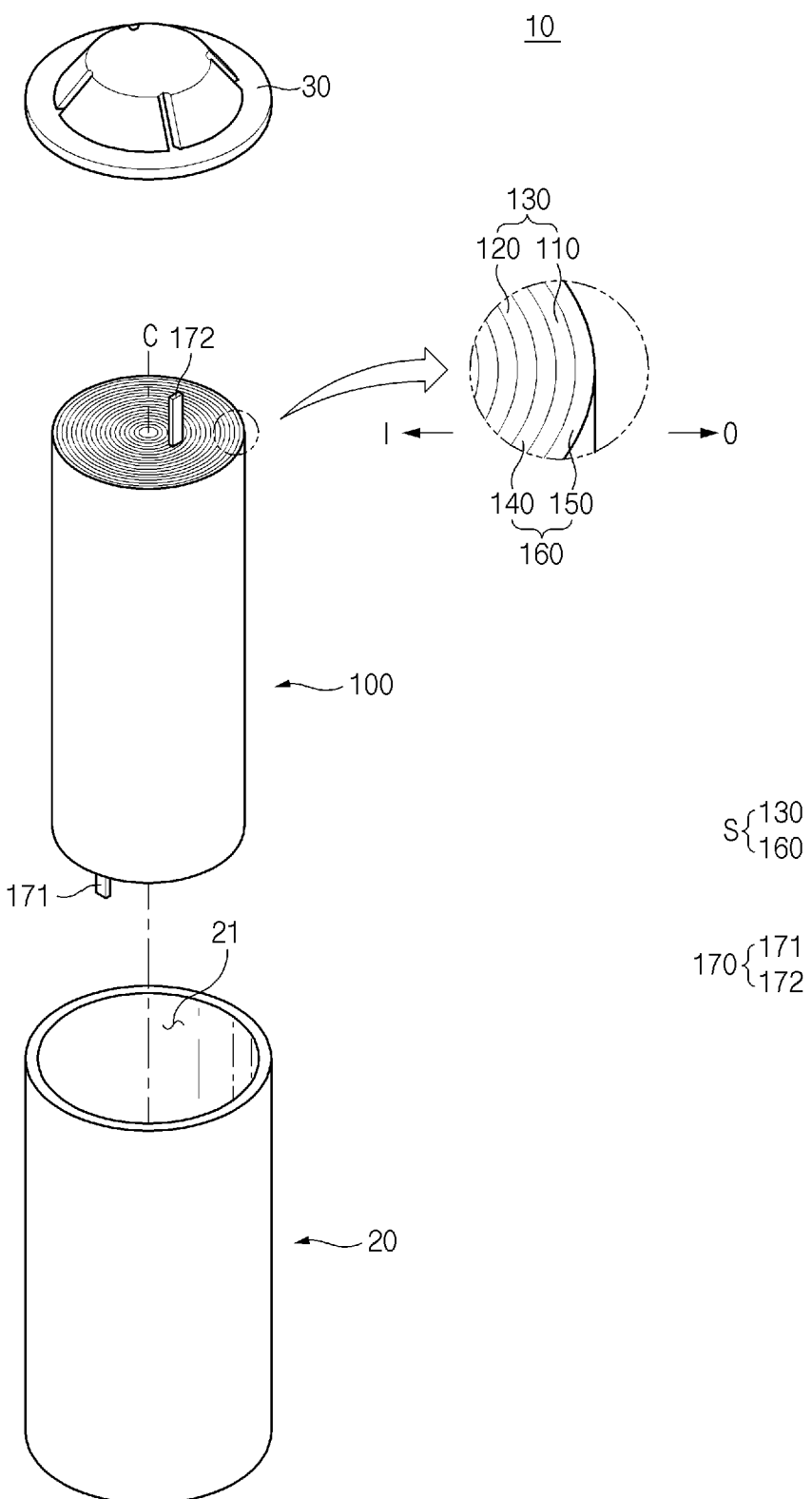
FIG. 1 is a perspective view of an electrode assembly and a secondary battery comprising the same according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Electrode Assembly According to First Embodiment

Figure 2:
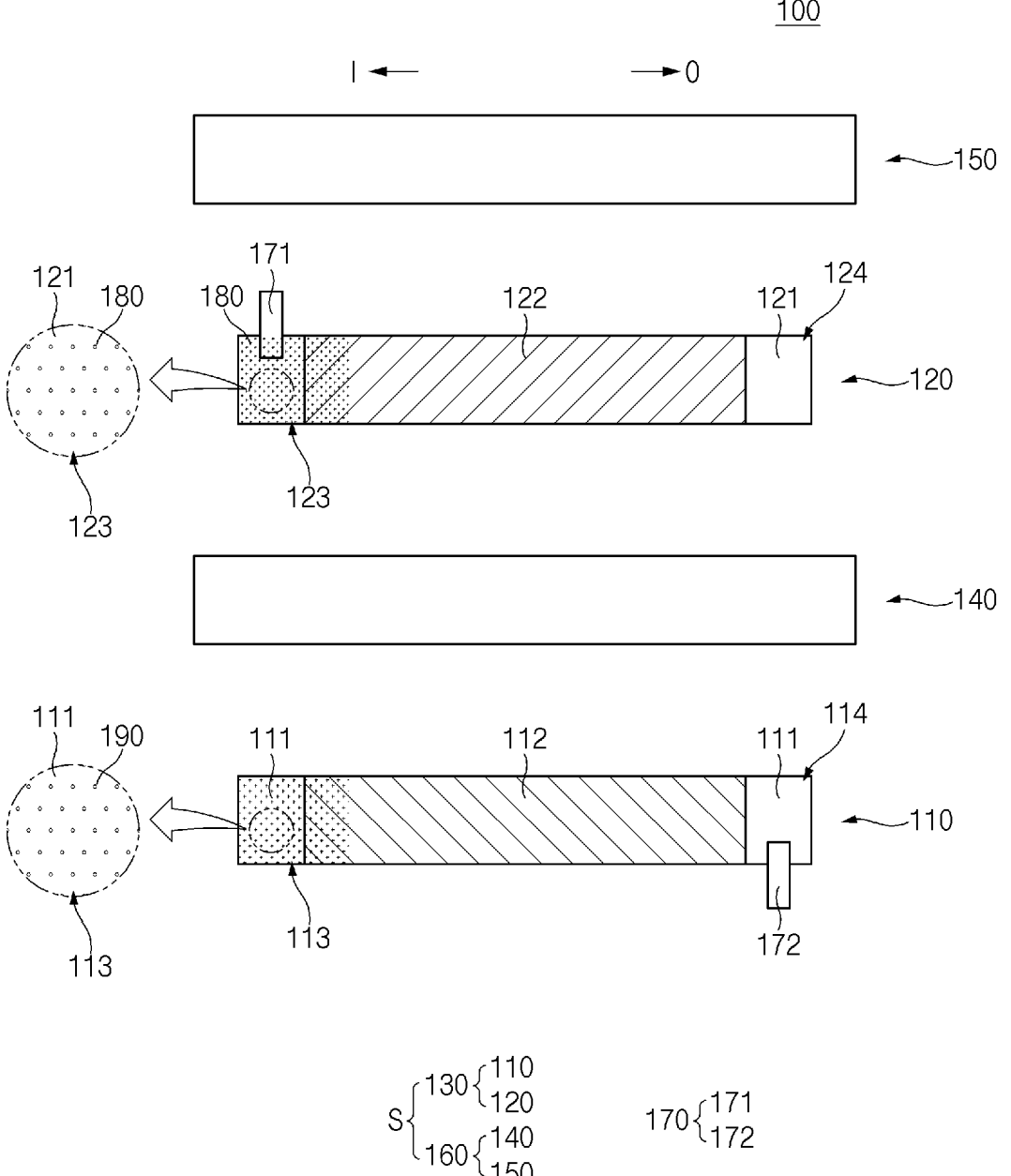
FIG. 2 is a plan view illustrating an unfolded state before an electrode assembly is wound according to a first embodiment of the present invention.
Figure 3:
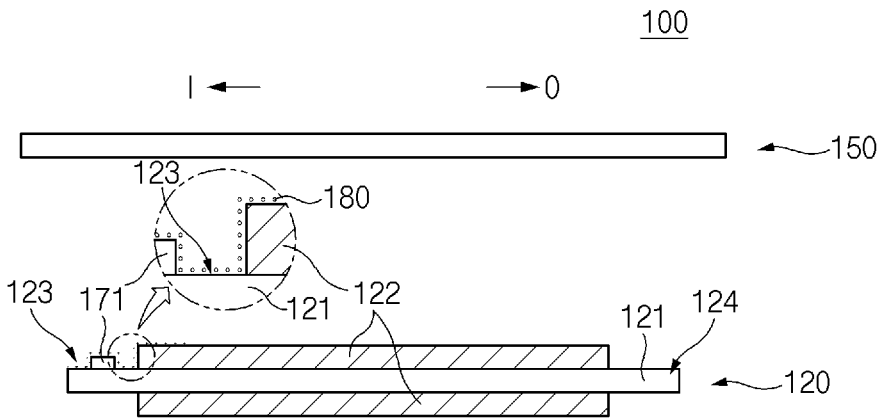
FIG. 3 is an elevation view illustrating the unfolded state before the electrode assembly is wound according to the first embodiment of the present invention.
Figure 3:
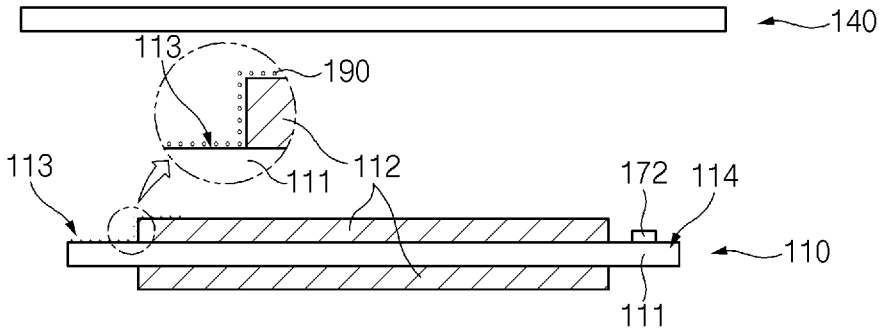

FIG. 1 is a perspective view of an electrode assembly and a secondary battery comprising the same according to an embodiment of the present invention, FIG. 2 is a plan view illustrating an unfolded state before an electrode assembly is wound according to a first embodiment of the present invention, and FIG. 3 is an elevation view illustrating the unfolded state before the electrode assembly is wound according to the first embodiment of the present invention.

Referring to FIGS. 1 to 3, an electrode assembly 100 according to a first embodiment of the present invention comprises an electrode stack S, in which electrodes 130 and a separator 160 are alternately stacked to be wound, and temperature difference compensating members 180 and 190 disposed at a winding center I of the electrode stack S. Each of the temperature difference compensating members 180 and 190 comprises a phase change material.

Hereinafter, the electrode assembly according to the first embodiment of the present invention will be described in more detail with reference to FIGS. 1 to 3.

Referring to FIGS. 1 and 3, the electrode stack S may be a chargeable and dischargeable power generation element and have a structure in which the electrodes 130 and the separator 160 are assembled to be alternately stacked with each other. Here, the electrode stack S may be formed in a shape in which the electrodes 130 and the separator 160 are alternately assembled to be wound. Here, an electrode stack S may be wound in a cylindrical shape wound around a central axis C.

The electrodes 130 may comprise a positive electrode 110 and a negative electrode 120. Also, the separator 160 separates and electrically insulates the positive electrode 110 and the negative electrode 120 from each other.

The positive electrode 110 may comprise a positive electrode collector 111, a positive electrode active material portion 112 that is an area on which a positive electrode active material is stacked on the positive electrode collector 111, and positive electrode non-coating portions 113 and 114 that are areas on which the positive electrode active material is not stacked. In this case, the positive electrode active material portion 112 may form a positive electrode coating portion.

The positive electrode collector 111 may be provided as, for example, foil made of an aluminum material.

The positive electrode active material may comprise lithium manganese oxide, lithium cobalt oxide, lithium nickel oxide, lithium iron phosphate, or a compound or mixture containing at least one of the above-described materials.

The positive electrode non-coating portions 113 and 114 may comprise a positive electrode non-coating portion 113 disposed at a winding center I and a positive electrode non-coating portion 114 disposed at a winding outer shell.

The negative electrode 120 may comprise a negative electrode collector 121, a negative electrode active material portion 122 that is an area, on which a negative electrode active material is stacked on the negative electrode collector 121, and negative electrode non-coating portions 123 and 124 that are areas on which the negative electrode active material is not stacked. In this case, the negative electrode active material portion 122 may form the negative electrode coating portion.

For example, the negative electrode collector 121 may be foil made of a copper (Cu) or nickel (Ni) material.

The negative electrode active material may comprise synthetic graphite, lithium a metal, a lithium alloy, carbon, petroleum coke, activated carbon, graphite, a silicon compound, a tin compound, a titanium compound, or an alloy thereof. Here, the negative electrode active material may further comprise, for example, non-graphite-based SiO (silica) or SiC (silicon carbide).

The negative electrode non-coating portions 123 and 124 may comprise a negative electrode non-coating portion 123 disposed at the winding center I and a negative electrode non-coating portion 124 disposed at the winding outer shell.

The separator 160 may be made of an insulating material to insulate the positive electrode 110 and the negative electrode 120 from each other.

Also, the separator 160 may be, for example, a multi-layered film produced by microporous polyethylene, polypropylene, or a combination thereof or a polymer film for solid polymer electrolytes or gel-type polymer electrolytes such as polyvinylidene fluoride, polyethylene oxide, polyacrylonitrile, or polyvinylidene fluoride hexafluoropropylene copolymers.

Also, the separator 160 may comprise a first separator 140 and a second separator 150.

Here, the positive electrode 110, the first separator 140, the negative electrode 120, and the second separator 150 may be sequentially stacked to form the electrode stack S.

An electrode tab 170 is attached to the electrode 130 and is electrically connected to the electrode 130.

The electrode tab 170 may comprise a positive electrode tab 172 attached to the positive electrode 110 and a negative electrode tab 171 attached to the negative electrode 120.

The positive electrode tab 172 may be formed in an upward direction in which a cap 30 is disposed in FIG. 1, and the negative electrode tab 171 may be disposed in a downward direction, i.e., toward a bottom surface of an accommodation part 21 of a battery case 20.

The temperature difference compensating members 180 and 190 are disposed at the winding center I of the electrode stack S to compensate so that the temperature difference between the winding outer shell and the winding center I of the electrode stack S is reduced.

Each of the temperature difference compensating members 180 and 190 may comprise a phase change material.

The phase change material is changed in phase from a solid to a liquid at a temperature above a predetermined temperature to absorb ambient heat. Thus, the phase change material may prevent the ambient temperature from rising above the predetermined temperature. Therefore, the temperature difference compensating members 180 and 190, each of which comprises the phase change material, may be disposed at the winding center I of the electrode stack S, and thus, the phase change material is changed in phase when the temperature at the winding center I rises above the predetermined temperature to absorb heat of the winding center I, thereby reducing the temperature difference between the winding outer shell O and the winding center I of the electrode stack S.

The phase change material may operate at a temperature of, for example, 0° C. to 100° C. or more. Here, the phase change material may be specifically made of a material that operates at a temperature of, for example, 35° C. to 80° C. or more. Here, the phase change material may be more specifically made of a material that operates at a temperature of, for example, 35° C. or more. Therefore, the phase change material may be made of a material that operates at a temperature of at least 35° C., and thus, a difference in reaction rate between the winding center I and the winding outer shell O of the electrode stack S, which causes deterioration of the battery performance, may not exceed.

The phase change material may be made of any one or more of hydrated inorganic salts, polyhydric alcohols, PET-PEG copolymers, poly ethylene glycol (PEG), polytetramethylene glycol (PTMG), and linear chain hydrocarbons.

Also, the temperature difference compensating members 180 and 190 may be disposed on at least one of the coating portion and the non-coating portion of the electrode 130. Here, for example, the temperature difference compensating members 180 and 190 may be disposed over the coating portion and the non-coating portion of the electrode 130 from the winding center I of the electrode stack S. That is, the temperature difference compensating members 180 and 190 are disposed over the coating portion and the non-coating portion 113 of the positive electrode 110 and the coating portion and the non-coating portion 123 of the negative electrode 120 at the winding center I of the electrode stack S.

In addition, each of the temperature difference compensating members 180 and 190 may be formed in the form of a micro capsule.

Here, in the temperature difference compensating members 180 and 190, the phase change material may be formed in, for example, the form of a capsule.

For another example, the temperature difference compensating members 180 and 190 may be formed in a form in which the phase change material is accommodated in the capsule coating material. Here, the temperature difference compensating members 180 and 190 may be, for example, a form in which gelatin, that is a capsule coating material, is applied to an outer surface of the phase change material, but the capsule coating material according to the present invention is not necessarily limited thereto.

In the electrode assembly 100 according to the first embodiment of the present invention, which is configured as described above, the temperature difference compensating members 180 and 190, each of which comprises the phase change material, are disposed at the winding center I of the electrode stack S to absorb ambient heat while the phase change material is changed in phase when the temperature of the winding center I of the electrode stack S rises above a predetermined temperature during the charging and discharging of the secondary battery 10. Therefore, the temperature difference between the winding outer shell O and the winding center I of the electrode stack S may be reduced to prevent the battery performance from being deteriorated.

Electrode Assembly According to Second Embodiment

Figure 4:
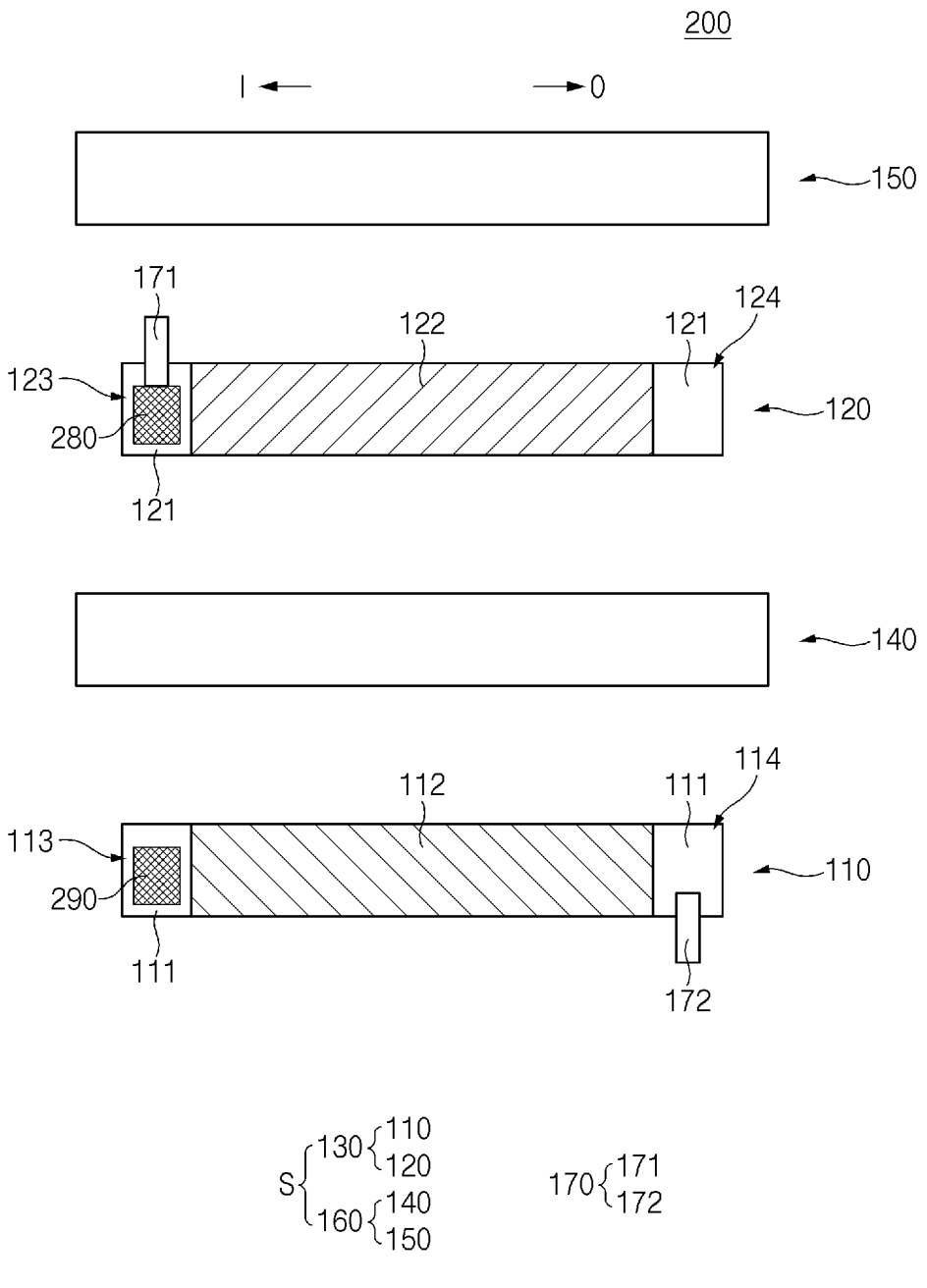
FIG. 4 is a plan view illustrating an unfolded state before an electrode assembly is wound according to a second embodiment of the present invention.
Figure 5:
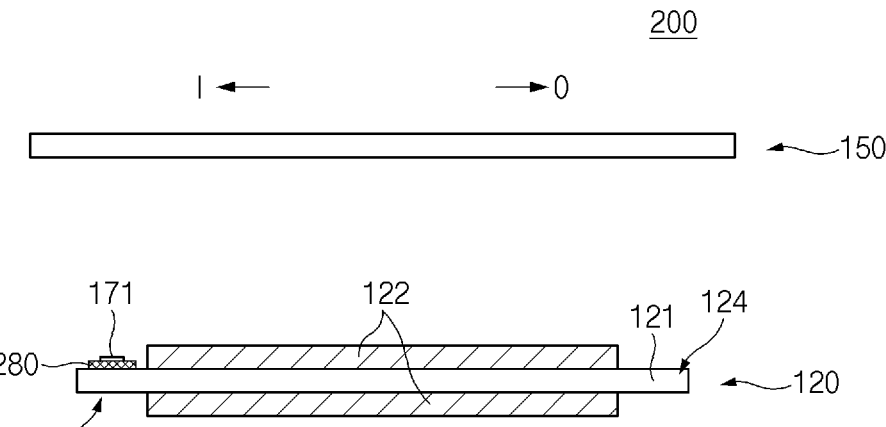
FIG. 5 is an elevation view illustrating the unfolded state before the electrode assembly is wound according to the second embodiment of the present invention.
Figure 5:
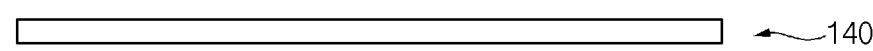
Figure 5:
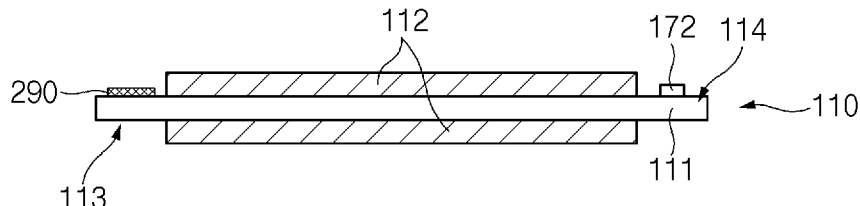

FIG. 4 is a plan view illustrating an unfolded state before an electrode assembly is wound according to a second embodiment of the present invention, and FIG. 5 is an elevation view illustrating the unfolded state before the electrode assembly is wound according to the second embodiment of the present invention.

Hereinafter, the electrode assembly 200 according to a second embodiment will be described.

Referring to FIGS. 1, 4, and 5, the electrode assembly 200 according to the second embodiment of the present invention comprises an electrode stack S, in which electrodes 130 and a separator 160 are alternately stacked to be wound, and temperature difference compensating members 280 and 290 disposed at a winding center I of the electrode stack S. Each of the temperature difference compensating members 280 and 290 comprises a phase change material.

The electrode assembly 200 according to the second embodiment of the present invention is different from the electrode assembly according to the foregoing first embodiment described in an embodiment of the temperature difference compensating members 280 and 290. Thus, contents of this embodiment, which are duplicated with those according to the first embodiment, will be omitted or briefly described, and also, differences therebetween will be mainly described.

In more detail, an electrode stack S has a structure in which electrodes 130 and a separator 160 are assembled and alternately stacked. Here, the electrode stack S may be formed in a shape in which the electrodes 130 and the separator 160 are alternately assembled to be wound. Here, the electrode stack S may be wound in a cylindrical shape wound around a central axis C.

The electrode 130 may comprise the positive electrode 110 and the negative electrode 120. Also, the separator 160 separates and electrically insulates the positive electrode 110 and the negative electrode 120 from each other.

An electrode tab 170 is attached to the electrode 130 and is electrically connected to the electrode 130.

The electrode tab 170 may comprise a positive electrode tab 172 attached to the positive electrode 110 and a negative electrode tab 171 attached to the negative electrode 120.

The temperature difference compensating members 280 and 290 are disposed at the winding center I of the electrode stack S to compensate so that the temperature difference between the winding outer shell and the winding center I of the electrode stack S is reduced.

Each of the temperature difference compensating members 280 and 290 may comprise a phase change material.

The phase change material is changed in phase from a solid to a liquid at a temperature above a predetermined temperature to absorb ambient heat.

The phase change material may operate at a temperature of, for example, 0° C. to 100° C. or more. Here, the phase change material may be specifically made of a material that operates at a temperature of, for example, 35° C. to 80° C. or more. Here, the phase change material may be more specifically made of a material that operates at a temperature of, for example, 35° C. or more.

The phase change material may be made of any one or more of hydrated inorganic salts, polyhydric alcohols, PET-PEG copolymers, poly ethylene glycol (PEG), polytetramethylene glycol (PTMG), and linear chain hydrocarbons.

In addition, the temperature difference correcting members 280 and 290 may be disposed on a non-coating portion of the electrode 130 at a winding center I of the electrode stack S. Here, the temperature difference compensating members 280 and 290 may be disposed on at least one or more of the positive non-coating portion 113 or the negative non-coating portion 123, which are disposed at the winding center I. Here, the temperature difference compensating members 280 and 290 may be attached to, for example, the positive non-coating portion 113 and the negative non-coating portion 123, which are disposed at the winding center I.

Furthermore, each of the temperature difference compensating members 280 and 290 may be formed in the form of fabric. In addition, the temperature difference compensating members 280 and 290 may be in a form in which a phase change material is applied to a fabric-like base material. Here, the fabric-like base material may be a fabric-like fiber. Here, the fabric-like fiber material may be, for example, nylon, but the fabric-like base material according to the present invention is not necessarily limited to nylon. The temperature difference compensating members 280 and 290 may be attached to the non-coated portion of the electrode 130 by comprising an adhesive when the phase change material is applied to the fabric-like base material.

Therefore, the temperature difference compensating members 280 and 290 may be formed in the form of the fabric so as not to be separated from the attached portion at the winding center I in the electrode stack S, thereby compensating the temperature difference between the winding center I and the winding outer shell O.

Electrode Assembly According to Third Embodiment

Figure 6:
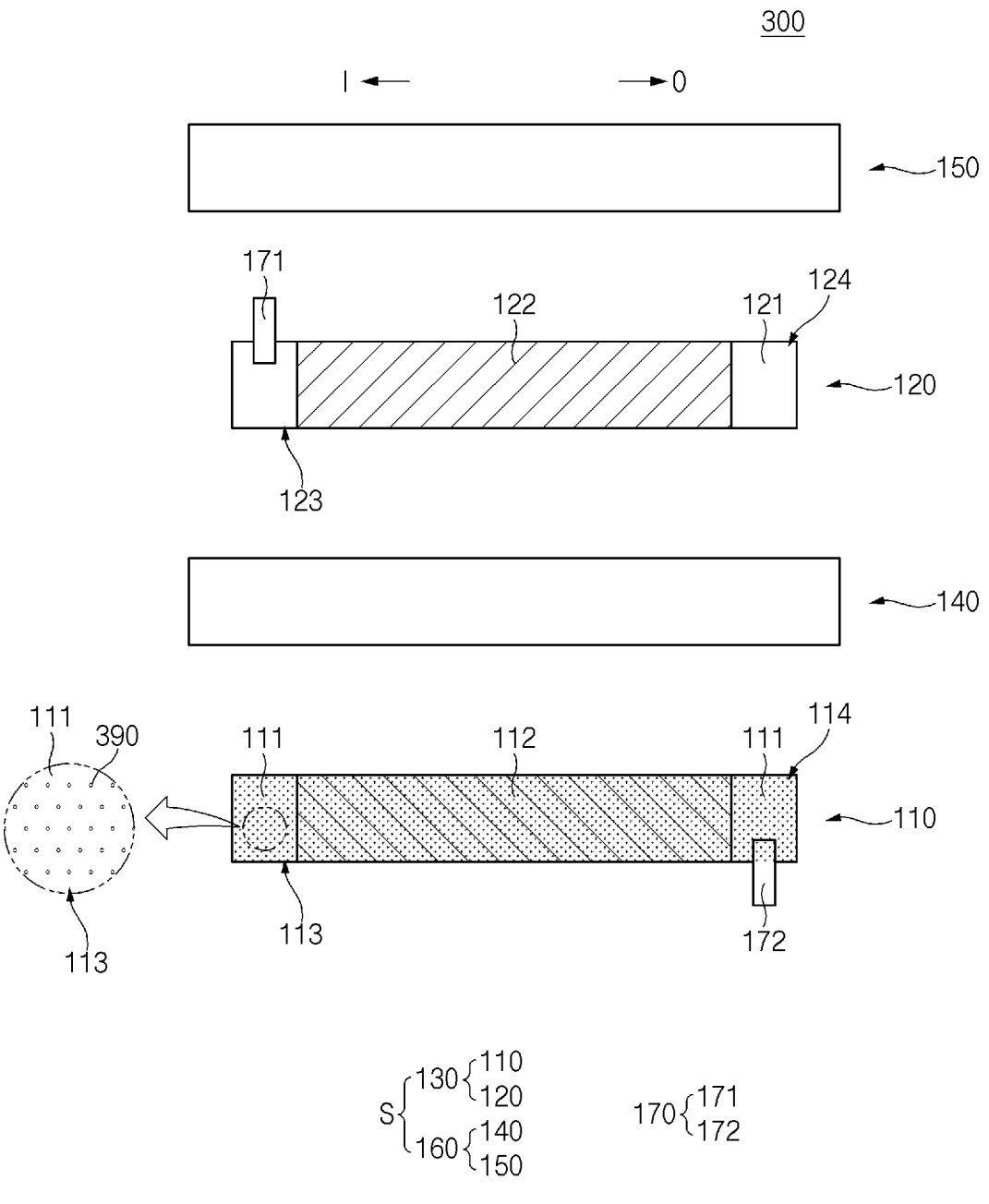
FIG. 6 is a plan view illustrating an unfolded state before an electrode assembly is wound according to a third embodiment of the present invention.
Figure 7:
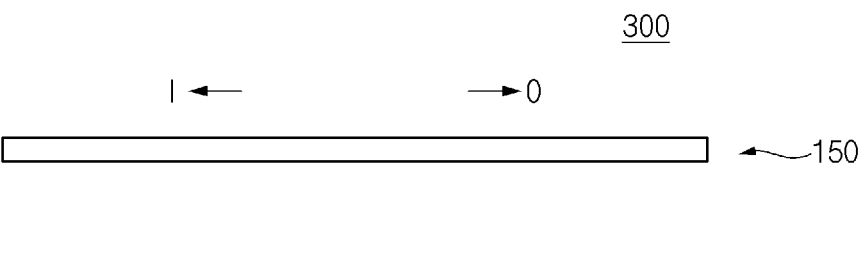
FIG. 7 is an elevation view illustrating the unfolded state before an electrode assembly is wound according to a third embodiment of the present invention.
Figure 7:
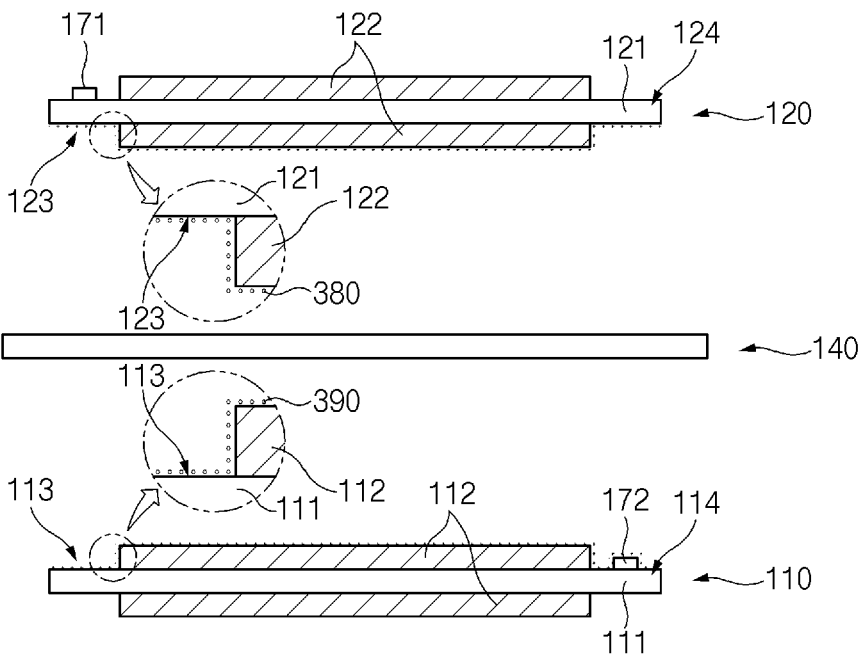

FIG. 6 is a plan view illustrating an unfolded state before an electrode assembly is wound according to a third embodiment of the present invention, and FIG. 7 is an elevation view illustrating the unfolded state before an electrode assembly is wound according to a third embodiment of the present invention.

Hereinafter, an electrode assembly 300 according to a third embodiment will be described.

Referring to FIGS. 6 to 7, the electrode assembly 300 according to the third embodiment of the present invention comprises an electrode stack S, in which electrodes 130 and a separator 160 are alternately stacked to be wound, and temperature difference compensating members 380 and 390 disposed at a winding center I of the electrode stack S. Each of the temperature difference compensating members 380 and 390 comprises a phase change material.

The electrode assembly 300 according to the third embodiment of the present invention is different from the electrode assembles according to the foregoing first and second embodiments in an embodiment of the temperature difference compensating members 380 and 390. Thus, contents of this embodiment, which are duplicated with those according to the forgoing embodiment, will be omitted or briefly described, and also, differences therebetween will be mainly described.

Referring to FIGS. 1, 6. and 7, the electrode stack S may be a chargeable and dischargeable power generation element and have a structure in which electrodes 130 and a separator 160 are assembled to be alternately stacked with each other. Here, the electrode stack S may be formed in a shape in which the electrodes 130 and the separator 160 are alternately assembled to be wound. Here, the electrode stack S may be wound in a cylindrical shape wound around a central axis C.

The electrode 130 may comprise the positive electrode 110 and the negative electrode 120. Also, the separator 160 separates and electrically insulates the positive electrode 110 and the negative electrode 120 from each other.

An electrode tab 170 is attached to the electrode 130 and is electrically connected to the electrode 130.

The electrode tab 170 may comprise a positive electrode tab 172 attached to the positive electrode 110 and a negative electrode tab 171 attached to the negative electrode 120.

The temperature difference compensating members 380 and 390 are disposed at the winding center I of the electrode stack S to compensate so that the temperature difference between the winding outer shell O and the winding center I of the electrode stack S is reduced.

Each of the temperature difference compensating members 380 and 390 may comprise a phase change material.

The phase change material is changed in phase from a solid to a liquid at a temperature above a predetermined temperature to absorb ambient heat.

The phase change material may operate at a temperature of, for example, 0° C. to 100° C. or more. Here, the phase change material may be specifically made of a material that operates at a temperature of, for example, 35° C. to 80° C. or more. Here, the phase change material may be more specifically made of a material that operates at a temperature of, for example, 35° C. or more.

The phase change material may be made of any one or more of hydrated inorganic salts, polyhydric alcohols, PET-PEG copolymers, poly ethylene glycol (PEG), polytetramethylene glycol (PTMG), and linear chain hydrocarbons.

In addition, the temperature difference correcting members 380 and 390 may be disposed between, for example, the positive electrode 110 and the negative electrode 120 at the winding center I of the electrode stack S. Here, the temperature difference compensating members 380 and 390 may be disposed on facing surfaces of the positive electrode 110 and the negative electrode 120 with the separator 160 therebetween. For another example, the temperature difference compensating members 380 and 390 are disposed between the positive electrode 110 and the negative electrode 120 at the winding center I and may be further disposed between the positive electrode 110 and the negative electrode 120 on the remaining area except for the winding center I in the electrode stack S. That is, the temperature difference compensating members 380 and 390 may be disposed on the entire area between the positive electrode 110 and the negative electrode 120.

In addition, each of the temperature difference compensating members 380 and 390 may be formed in the form of a micro capsule.

Here, in the temperature difference compensating members 380 and 390, the phase change material may be formed in, for example, the form of a capsule.

For another example, the temperature difference compensating members 380 and 390 may be formed in a form in which the phase change material is accommodated in the capsule coating material. Here, the temperature difference compensating members 380 and 390 may be, for example, a form in which gelatin, that is a capsule coating material, is applied to an outer surface of the phase change material, but the capsule coating material according to the present invention is not necessarily limited thereto.

In the electrode assembly 300 according to the third embodiment of the present invention, which is configured as described above, the temperature difference compensating members 380 and 390, each of which comprises the phase change material, are formed on the entire area between the positive electrode 110 and the negative electrode 120, which comprises the winding center I and the winding outer shell O of the electrode stack S, to absorb a portion of the heat of the electrode stack S while the phase change material is changed in phase when a temperature of a portion of the electrode stack S rises above a predetermined temperature during the charging and discharging of the secondary battery 10. Thereby, a temperature difference between one portion of the electrode stack S and the other portion is reduced to prevent the battery performance from being deteriorated.

Secondary Battery

Hereinafter, a secondary battery according to an embodiment will be described.

Referring to FIGS. 1 and 2, a secondary battery 10 according to an embodiment of the present invention comprises an electrode assembly 100 and a battery case 20. The electrode assembly 100 comprises an electrode stack S, in which electrodes 130 and a separator 160 are alternately stacked to be wound, and temperature difference compensating members 180 and 190 disposed at a winding center I of the electrode stack S. Each of the temperature difference compensating members 180 and 190 comprises a phase change material.

The secondary battery 10 according to an embodiment of the present invention relates to a secondary battery comprising the electrode assembly according to the foregoing first to third embodiments. Thus, contents of this embodiment, which are duplicated with those according to the forgoing embodiment, will be omitted or briefly described, and also, differences therebetween will be mainly described.

In more detail, a secondary battery 10 according to an embodiment of the present invention comprises an electrode assembly 100 and a battery case 20 in which the electrode assembly 100 is accommodated. Here, the secondary battery 10 according to the embodiment of the present invention may further comprise an electrolyte accommodated in the battery case 20.

The battery case 20 may have an upwardly opened accommodation part 21 in which the electrode assembly 100 is accommodated. Here, the battery case 20 may be formed in, for example, a cylindrical shape.

The secondary battery 10 according to an embodiment of the present invention may further comprise a cap 30 covering an opened accommodation part 21 of the battery case 20.

An electrode tab 170 is attached to the electrode 130 and is electrically connected to the electrode 130.

The electrode tab 170 may comprise a positive electrode tab 172 attached to the positive electrode 110 and a negative electrode tab 171 attached to the negative electrode 120.

The positive electrode tab 172 may be formed in an upward direction in which a cap 30 is disposed in FIG. 1, and the negative electrode tab 171 may be disposed in a downward direction, i.e., toward a bottom surface of an accommodation part 21 of a battery case 20. Here, the cap 30 connected to the positive electrode tab 172 may form a positive electrode terminal, and a lower portion of the battery case 20 connected to the negative electrode tab 171 may form a negative electrode terminal. Here, the cap 30 and the battery case 20 may be insulated from each other.

While the present invention has been particularly shown and described with reference to exemplary embodiments thereof, it is to be understood that the scope of the present invention is not limited thereto. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS

10: Secondary battery
20: Battery case
21: Accommodation part
30: Cap
100, 200, 300: Electrode assembly
110: Positive electrode
111: Positive electrode collector
112: Positive electrode active material portion
113, 114: Positive electrode non-coating portion

120: Negative electrode
121: Negative electrode collector
122: Negative electrode active material portion
123, 124: Negative electrode non-coating portion
130: Electrode
140: First separator
150: Second separator
160: Separator
170: Electrode tab
172: Positive electrode tab
171: Negative electrode tab
180, 190, 280, 290, 380, 390: Temperature difference compensating members
C: Central axis
I: Winding center
O: Winding outer shell
S: Electrode stack

The invention claimed is:

1. An electrode assembly comprising:
an electrode stack, in which electrodes and a separator are alternately stacked to be wound; and
a temperature difference compensating member disposed at a winding center of the electrode stack such that a temperature difference between a winding outer shell and the winding center of the electrode stack is reduced, wherein the temperature difference compensating member comprises a phase change material,
wherein the temperature difference compensating member is disposed on at least one of a coating portion or a non-coating portion of at least one electrode of the electrodes, and
wherein a thickness of the temperature difference compensating member is less than a thickness of an electrode active material layer on the coating portion.

2. The electrode assembly of claim 1, wherein the phase change material is changed in phase from a solid to a liquid at a temperature above a predetermined temperature to absorb ambient heat.

3. The electrode assembly of claim 2, wherein the phase change material operates at a temperature of 0° C. to 100° C.

4. The electrode assembly of claim 3, wherein the phase change material operates at a temperature of 35° C. to 80° C.

5. The electrode assembly of claim 1, wherein the phase change material comprises one or more of hydrated inorganic salts, polyhydric alcohols, PET-PEG copolymers, poly ethylene glycol (PEG), polytetramethylene glycol (PTMG), or linear chain hydrocarbons.

6. The electrode assembly of claim 1, wherein the temperature difference compensating member is disposed on the coating portion of the at least one electrode of the electrodes.

7. The electrode assembly of claim 1, wherein the temperature difference compensating member is attached to the non-coating portion of at least one electrode of the electrodes.

8. The electrode assembly of claim 1, wherein the electrodes comprise a positive electrode and a negative electrode, and
the temperature difference compensating member is disposed between the positive electrode and the negative electrode.

9. The electrode assembly of claim 8, wherein the temperature difference compensating member is further disposed between the positive electrode and the negative electrode on a remaining area except for the winding center of the electrode stack.

10. The electrode assembly of claim 8, wherein the temperature difference compensating member is provided as a plurality of temperature difference compensating members, the plurality of temperature difference compensating members being disposed on each of facing surfaces of the positive electrode and the negative electrode with the separator therebetween.

11. The electrode assembly of claim 1, wherein the temperature difference compensating member is formed in the form of a micro capsule.

12. The electrode assembly of claim 1, wherein the temperature difference compensating member is formed in the form of fabric.

13. A secondary battery comprising the electrode assembly of claim 1.

14. The electrode assembly of claim 9, wherein the temperature difference compensating member is provided as a plurality of temperature difference compensating members, the plurality of temperature difference compensating members are disposed on each of facing surfaces of the positive electrode and the negative electrode with the separator therebetween.

15. The electrode assembly of claim 9, wherein the temperature difference compensating member is formed in the form of a micro capsule.

16. The electrode assembly of claim 9, wherein the temperature difference compensating member is formed in the form of fabric.

17. An electrode assembly comprising:

an electrode stack, in which electrodes and a separator are alternately stacked to be wound; and a temperature difference compensating member disposed at a winding center of the electrode stack such that a temperature difference between a winding outer shell and the winding center of the electrode stack is reduced, wherein the temperature difference compensating member comprises a phase change material, wherein the temperature difference compensating member is disposed on a non-coating portion of at least one electrode of the electrodes at the winding center of the electrode stack, and wherein the temperature difference compensating member has a smaller surface area than a surface area of the non-coating portion of the at least one electrode of the electrodes at the winding center of the electrode stack.

* * * * *